Patented Apr. 25, 1933

1,905,433

UNITED STATES PATENT OFFICE

OWEN G. BENNETT, OF BALTIMORE, MARYLAND, AND CAREY B. JACKSON, OF MERIDIAN, MISSISSIPPI, ASSIGNORS TO CATALYST RESEARCH CORPORATION, OF BALTIMORE, MARYLAND, A CORPORATION OF MARYLAND

HYDROGENATION CATALYST

No Drawing.   Application filed September 27, 1932. Serial No. 635,048.

This invention relates to hydrogenation catalysts, and one of its chief objects is to provide supported nickel catalysts capable of effecting singularly far-reaching hydrogenation of unsaturated liquids, especially of the fatty oils and allied fatty bodies.

In a copending application, Serial No. 618,023, filed by one of us on June 18, 1932, now Patent 1,893,155, there are disclosed supported nickel catalysts which possess unusually high activity for liquid phase hydrogenation, particularly of oil hydrogenation. The catalysts disclosed and claimed therein are reduction products of nickel chromites, and they comprise metallic nickel in catalytic form supported on chromium oxide, both formed in reduction of the chromite. In the practice of that invention nickel chromite is prepared, as by simple heating of nickel chromate, and the chromite is then reduced by heating to an elevated temperature in contact with hydrogen. Most advantageously precipitated nickel ammonium chromates are used, as will be described more in detail hereinafter. The catalysts prepared in accordance with that invention are characterized by the ability to effect a greater degree of hydrogenation or hardening of oils than the catalysts theretofore available and capable of commercial application.

The present invention is predicated in part upon our discovery that catalysts of the type referred to but of substantially greater activity may be obtained by the use of sulfur compounds in certain restricted amounts in preparing the catalysts by the nickel chromite method described in the aforesaid copending application. In other words, the catalysts provided by this invention are capable of effecting much more profound hydrogenation of fatty oils and the like than the catalysts disclosed in the application identified hereinabove.

The belief in the hydrogenation art has been that sulfur is a virulent catalyst poison and that even infinitesimal amounts of it cannot be tolerated without deleteriously affecting the activity of the catalysts, or even paralyzing it completely. Moreover, the belief has prevailed that sulfide sulfur is particularly noxious in this regard. Contrary to those beliefs, however, we have discovered that within certain limits, presently to be defined, the use of sulfur compounds is actually and substantially beneficial to the activity of nickel catalysts prepared by reduction of nickel chromites, and that sulfur in the form of sulfide may be used for this purpose. In other words, sulfur apparently super-activates the already highly active catalysts made by that procedure. Various sulfur compounds may be used for the purposes of this invention.

In the practice of the invention disclosed in application Serial No. 618,023 the nickel chromates used may be prepared in various ways, as by reaction in solution of nickel salts and chromic acid, or soluble dichromates, to provide solutions of nickel chromates. Upon evaporating the latter solution to dryness and heating the residual chromate is converted to chromite, which may then be reduced with gaseous hydrogen to prepare the desired catalyst.

Most advantageously, however, the chromates are prepared by precipitation from solution, especially of nickel ammonium chromates. These precipitated chromates appear to be in a physical condition which favors particularly high activity, and the driving off of ammonia in converting the chromate to chromite may contribute to this. One such chromate may be made by reaction of two mols of ammonium chromate and one mol of nickelous nitrate in cold aqueous solution. This reaction produces a yellowish-greenish precipitate which apears to have the empirical

$Ni(NH_4)_2(CrO_4)_2$ (Formula I).

This compound loses oxygen and ammonia when heated and is converted to a compound having the empirical formula $NiCr_2O_4$, i. e. a nickel chromite. Reduction of the chromite with hydrogen converts it to metallic nickel supported upon chromium oxide. The ratio of nickel to chromium in the catalyst is 1 : 2.

Most suitably, however, there is used a precipitated chromate of the empirical formula

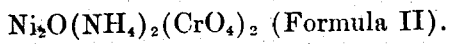 (Formula II).

This latter compound forms the compound $Ni_2Cr_2O_5$, also presumably a chromite, from which it will be seen that in the resultant reduced catalyst the ratio of nickel to chromium is 1 : 1. This affords a high proportion of catalytic nickel per unit weight of $Cr_2O_3$ support, which is obviously desirable. Also, this catalyst is, in general, more active than that made by the $NiCr_2O$ procedure just refered to.

The catalysts described in the aforesaid copending application form the basis of the catalysts provided by this invention, and the same fundamental process of preparation is used in each case. As illustrative of the prefered procedure, there may be reacted one mol of nickelous nitrate with one mol of chromic anhydride and three mols of ammonium hydroxide to precipitate the double chromate represented by Formula II. The chromic acid and nickel salt are dissolved to form a concentrated aqueous solution, and commercial ammonium hydroxide in amount equal to three mols of $NH_4OH$ is added thereto while stirring rapidly. The chromate appears as very fine brick red precipitate. Ammonium chromate and nickel nitrate may be used in suitable proportions to form the same compound, but the solubility of ammonium chromate is such that concentrated solutions can not be used, and in consequence the physical character of the resultant product is different from that obtained by the procedure just described, and the final product is somewhat less active.

The red precipitate is filtered from the mother liquor, dried at about 100° C., and heated to 300 or 350° C., whereupon a large amount of gas is liberated, the compound being decomposed to the corresponding nickel chromite. The chromite is then reduced to form the catalyst by heating it slowly up to about 500° C. while passing a slow stream of hydrogen over it in a suitable container. This mode of reduction does not necessarily completely reduce all of the chromite, but it appears to provide the most active product. If the chromite is completely reduced the catalyst consists of nickel intimately associated with chromium sesquioxide, while if the reduction is not complete the product may combine some amount of unreduced chromite.

In the practice of the present invention a tolerable amount of a sulfur compound is introduced into, or admixed with, the chromate used in the preparation of the catalyst. This may be done by adding sulfur compound to the precipitate, or to the reacting solutions, for adsorption, for example, by the precipitated chromate, or the sulfate may actually enter into the reaction by which the chromate is formed.

As an example of the practice of this invention, reference may be had to the preparation of a catalyst from the chromate of Formula II, which constitutes the preferred embodiment, prepared from concentrated solution by the reaction

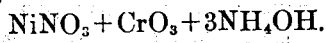

In accordance with this invention nickel sulfate may be added to the reacting solution to provide the sulfur compound. This reacts with the ammonium hydroxide to precipitate nickel hydroxide, which subsequently is converted to metallic nickel, and with formation of ammonium sulfate, i. e. a compound of sulfur. Ammonium sulfate being highly soluble the preponderance of this compound will remain dissolved in the mother liquor, but some small amount of it will be carried down by the precipitated chromate, e. g. by adsorption. Upon conversion to chromite followed by reduction there is formed a hydrogenation catalyst of abnormaly high activity, and of activity greater than that of the catalyst prepared in a similar manner without the use of sulfur.

The activity of the catalyst is dependent in part upon the amount of sulfate which is added in this manner, too little sulfate being effective but not providing maximum activity, and too much sulfate giving a product of unsatisfactory activity. This may be shown best by actual examples, of which the following tests are characteristic. The catalysts shown in the tabulation were used for the hydrogenation of cotton seed oil having an iodine number of about 110. Enough catalyst was added to the oil to provide 0.2175 per cent of nickel. The oil was heated to 180° C., and hydrogen at atmospheric pressure was passed in for 30 minutes while stirring at high speed. The data follow:

| Catalyst | Preparation of catalyst | Iodine No. |
|---|---|---|
| A | $NiSO_4+CrO_3+3 NH_4OH$—not washed | No hardening. |
| B | $NiSO_4+CrO_3+3NH_4OH$—thoroughly washed. | 22 |
| C | $NiNO_3+CrO_3+3NH_4OH$—not washed | 30 |
| D | Like C+16 gms $NiSO_4$ per mol of $Ni(NO_3)$ added. | 12 |
| E | Like C—8 gms $NiSO_4$ per mol of $Ni(NO_3)$ added. | 8 |
| F | Like C—4 gms $NiSO_4$ per mol of $Ni(NO_3)$ added. | 4 |
| G | Like C—2 gms $NiSO_4$ per mol of $Ni(NO_3)$ added. | 16 |

These tests show that the catalysts embodied in the invention of application Serial No. 618,023, as exemplified by catalyst C, are valuable, being capable of effecting unusually great hardening of the oil. Catalyst A, prepared using nickel sulfate as the exclusive source of nickel, instead of nickel nitrate, when prepared in the same manner as C, i. e., without being washed, was wholly inactive. The chromate, being unwashed, retained an excessive amount of sulfur compound, which poisoned the resultant catalyst. Catalyst B, however, prepared in exactly the same manner as catalyst A, except that the chromate precipitate was thoroughly washed, gave a catalyst of whose activity was markedly better than that of catalyst C, prepared from nickel nitrate alone without sulfur. In the preparation of catalyst B the washing of the chromate precipitate removed all but a tolerable and activating amount of the residual sulfur compound. The ability of catalyst B to reduce the iodine number by an additional eight points, as compared with catalyst C, is significant, because it is in this range of hardening, i. e. close to saturation, that it has been difficult to improve the activity.

Catalysts D to G clearly demonstrate the benefits of the invention and show the effect of varying amounts of nickel sulfate added in the production of the catalyst using nickel nitrate as the chief source of nickel. Each of these catalysts is of much greater activity than that of catalyst C, prepared in the same manner but without sulfur. These data show that the use of about four grams of nickel sulfate per mol of nickel nitrate produces catalysts of outstanding activity, catalyst F being capable of reducing the iodine number of the treated oil to an extraordinarily low value. With still smaller amounts of sulfur compound (G) the activity was not so great, although the catalyst was still about 100 per cent more efficient than catalyst C.

As further indicating the benefits to be derived from the invention, and the general applicability of sulfur compounds for the purpose of the invention, we have made catalysts having the enhanced activity characteristic of this invention by the use of other sulfates, as well as by sulfides and sulfur acids. Catalysts characteristic of this aspect of the invention, made by the addition of the sulfur compounds shown to solution used in preparing catalyst C are shown in the following table:

| Catalyst | Prepared from | Iodine No. |
|---|---|---|
| H | Catalyst C+4 gms. BaS | 14.8 |
| I | Catalyst C+4 gms. CuSO₄ | 14.1 |
| J | Catalyst C+2.5 gms. H₂SO₄ | 7.0 |

These catalysts were tested with cottonseed oil in the manner described for catalysts A to G. The results show that the invention is not restricted to the use of any specific compound of sulfur, and that sulfide sulfur is a powerful activator.

These tests show that the catalysts of this invention may be made using nickel sulfate as the sole source of both nickel and sulfur, provided the precipitated chromate be thoroughly washed to reduce the sulfur to an amount which activates the catalyst, or by using nickel or other sulfate, or other compound of sulfur as an ancillary addition, in appropriate amounts, to supply sulfur for the activation. The exact amount of sulfur needed for this purpose, and the precise upper limit beyond which the results are not obtained is not known to us, nor is the mechanism by which the sulfur activates these catalysts known, it being, on the contrary, quite obscure.

The quantity of sulfur compound which remains in the catalyst is necessarily very small, for most of the ammonium sulfate (formed by metathesis from the nickel sulfate), or other sulfur compound, will be carried away in the mother liquor, which is filtered from the precipitate. The amount remaining in the catalyst must be exceedingly small, as all attempts to determine it have been unsuccessful. Also, the amount of sulfur compound present in the chromate or chromite will vary according to the particular source of sulfur, the extent of washing (where used), and other factors.

For the foregoing reasons the amount of sulfur compound used in the practice of the invention is referred to herein as being a tolerable amount." By this we mean such amount of sulfur compound as effects substantial activation of the catalyst, as compared with a catalyst prepared without the use of sulfur compounds. Obviously, the tolerable limit cannot include amounts of sulfur which decrease the catalytic activity. Under the circumstances set forth we are unable to define the exact amounts of sulfur compound embodied in the invention in any other manner.

The invention is predicated further on the discovery that the activity of oil hydrogenation catalysts made by reduction of nickel chromites may be increased also by suitable regulation of the mode of precipitation of the chromate, and further that this embodiment may be combined with the use of sulfur as described hereinabove. More specifically, it has been found that the activity of the catalysts made from nickel chromate is dependent in part upon the conditions under which the chromate is precipitated, especially the rate of precipitation. Our work has shown that in production of the chromate of Formula II the activity may be controlled by regulation of the rate at which the ammonia is added. More in detail, if the entire amount of ammonia is added at once the activity of the resultant catalyst is substantially greater than that of catalyst made from chromate precipitated by slow addition of ammonia.

The rapid addition of the ammonia, for the purpose mentioned, may, however, be disadvantageous for some purposes, inasmuch as the precipitate tends to be of a gelatinous character, which retards filtration. On the other hand, when the ammonia is added slowly, for example over a period of 10 minutes, the precipitate is finely crystalline and filters quickly and easily. Where the filtering characteristics are not of predominant importance catalysts of enhanched activity (e. g. able to reduce the iodine number by 12 points, as compared with slow precipitated catalysts) may be made by the rapid precipitation method just described, e. g. by dumping in the entire amount of ammonia at once.

In either instance the use of sulfur is of particular advantage. Thus, three mols of commercial ammonia (about 200 cc.) were dumped into a solution of one mol of nickelous nitrate, one mol or chromic acid and four grams of nickel sulfate in 250 cc. of water (catalyst K). To an identical solution there was added a similar amount of ammonia, but in this instance the ammonia was added slowly over a period of ten minutes (catalyst L). These catalysts were then applied to the hydrogenation of cottonseed oil in the manner described hereinabove. The chromate of catalyst K was a light brick gelatinous material which filtered more slowly than that of catalyst L, which was purplish brown and crystalline. Catalyst K gave an iodine number of 6, and catalyst L an iodine number of 22. Both of these catalysts are of better activity than those made without sulfur, and the advantage of rapid precipitation is apparent.

According to the provisions of the patent statutes, we have explained the principle of our invention and have described what we now consider to represent its best embodiment. However, we desire to have it understood that, within the scope of the appended claims, the invention may be practiced otherwise than as specifically described.

We claim:

1. The method of making a nickel catalyst for hydrogenation of unsaturated fatty oils and the like, comprising heating a nickel chromate admixed with a tolerable amount of sulfur to convert the chromate to chromite, and reducing said chromite at an elevated temperature with hydrogen and thereby forming metallic nickel activated by said sulfur to a state of enhanced hydrogenation ability as compared with nickel prepared in the same way without the use of sulfur compound.

2. The method of making a nickel catalyst for hydrogenation of unsaturated fatty oils and the like, comprising heating a precipitated nickel ammonium chromate admixed with a tolerable amount of a compound of sulfur to convert the chromate to nickel chromite, and reducing said chromite at an elevated temperature with hydrogen to thereby form metallic nickel activated by said sulfur compound to a state of enhanced hydrogenation ability as compared with nickel prepared in the same way without the use of sulfur compound.

3. The method of making a nickel catalyst for hydrogenation of unsaturated fatty oils and the like, comprising preparing an admixture of precipitated nickel ammonium chromate corresponding to the formula $Ni_2O(NH_4)_2(CrO_4)_2$ and a tolerable amount of a compound of sulfur, heating said mixture to convert the chromate to nickel chromite, and reducing said chromite at an elevated temperature with hydrogen to thereby form metallic nickel activated by said sulfur compound to a state of enhanced hydrogenation ability as compared with nickel prepared in the same way without the use of sulfur compound.

4. A process according to claim 3, said sulfur compound comprising a sulfate.

5. A process according to claim 3, said sulfur compound comprising sulfuric acid.

6. A process according to claim 3, said sulfur compound comprising barium sulfide.

7. The method of making a nickel catalyst for hydrogenation of unsaturated fatty oils and the like, comprising reacting in the presence of a sulfur compound, a soluble nickel salt, a chromium compound, and ammonia to form precipitated nickel ammonium chromate containing a tolerable amount of said sulfur compound, heating said chromate to convert it to nickel chromite, and reducing the chromite at an elevated temperature with hydrogen to thereby form metallic nickel activated by said sulfur compound to a state of enhanced hydrogenation ability as compared with nickel prepared in the same way without the use of sulfur compound.

8. The method of making a nickel catalyst for hydrogenation of unsaturated fatty oils and the like, comprising reacting in the presence of a sulfur compound and in concentrated solution a soluble nickel salt, chromic acid, and ammonia in proportions productive of a precipitated compound corresponding substantially to $Ni_2O(NH_4)_2(CrO_4)_2$ to produce said precipitate containing a tolerable amount of said sulfur compound, heating said precipitate to about 350° C, and reducing the heated product at an elevated temperature with hydrogen and thereby forming metallic nickel activated by said sulfur compound to a state of enhanced hydrogenation ability as compared with nickel prepared in the same way without the use of sulfur compound.

9. A process according to claim 8, said nickel salt being nickelous nitrate.

10. The method of making a nickel catalyst for hydrogenation of unsaturated fatty oils and the like, comprising heating a nickel chromate containing a tolerable amount of a sulfate to convert the chromate to chromite, and reducing said chromite at an elevated temperature with hydrogen and thereby forming metallic nickel activated by said sulfate to a state of enhanced hydrogenation ability as compared with nickel prepared in the same way without the use of sulfur compound.

11. The method of making a nickel catalyst for hydrogenation of unsaturated fatty oils and the like, comprising precipitating a nickel ammonium chromate in the presence of a tolerable amount of a sulfate, heating said chromate to convert it to nickel chromite, and reducing said chromite at an elevated temperature with hydrogen and thereby forming metallic nickel activated by said sulfate to a state of enhanced hydrogenation ability as compared with nickel prepared in the same way without the use of sulfur compound.

12. The method of making a nickel catalyst for hydrogenation of unsaturated fatty oils and the like, comprising adding ammonia to a solution of nickel nitrate, chromic acid, and nickel sulfate in an amount between about 2 to 16 grams per mol of said nitrate to precipitate a nickel ammonium chromate corresponding to the empirical formula $Ni_2O(NH_4)_2(CrO_4)_2$ and containing a tolerable amount of sulfate radical, heating said chromate to convert it to nickel chromite, and reducing said chromite at an elevated temperature with hydrogen and thereby forming metallic nickel activated by said sulfate to a state of enhanced hydrogenation ability as compared with nickel prepared in the same way without the use of sulfur compound.

13. The method of making a nickel catalyst for hydrogenation of unsaturated fatty oils and the like, comprising preparing a solution of a nickel salt and chromic acid, and rapidly adding sufficient ammonia to precipitate a nickel ammonium chromate, heating said chromate to convert it to nickel chromite, and reducing the chromite at an elevated temperature with hydrogen and thereby forming metallic nickel in a state of enhanced hydrogenation ability.

14. The method of making a nickel catalyst for hydrogenation of unsaturated fatty oils and the like, comprising preparing a solution containing a sulfur compound, a nickel salt, and a chromium compound, adding rapidly sufficient ammonia to precipitate a nickel ammonium chromate containing a tolerable amount of said sulfur compound, heating said chromate to convert it to nickel chromite, and reducing the chromite at an elevated temperature with hydrogen and thereby forming metallic nickel activated by said sulfur compound to a state of enhanced hydrogenation ability as compared with nickel prepared in the same way without the use of sulfur compound.

15. The method of making a nickel catalyst for hydrogenation of unsaturated fatty oils and the like, comprising preparing a solution of nickel salt and a chromium compound, adding substantially at once sufficient ammonia to precipitate a nickel ammonium chromate, heating said chromate to convert it to nickel chromite, and reducing said chromite at an elevated temperature with hydrogen and thereby forming metallic nickel in a state of enhanced hydrogenation ability.

16. The method of making a nickel catalyst for hydrogenation of unsaturated oils and the like, comprising reacting in the presence of a sulfate, a nickel salt and chromic acid with sufficient ammonia, added rapidly, to precipitate nickel ammonium chromate corresponding substantially to the formula $Ni_2O(NH_4)_2(CrO_4)_2$ and containing a tolerable amount of said sulfate, heating said chromate to convert it to nickel chromite, and reducing the chromite at an elevated temperature with hydrogen and thereby forming metallic nickel activated by said sulfate to a state of enhanced hydrogenation ability as compared with nickel prepared in the same way without the use of sulfur compound.

17. The method of making a nickel catalyst for hydrogenation of unsaturated oils and the like, comprising adding rapidly 3 mols of ammonia to a concentrated solution of 1 mol each of nickel nitrate and chromic acid, and containing from about 2 to 16 grams of nickel sulfate to form a precipitate of nickel ammonium chromate containing a tolerable amount of sulfate radical, heating said chromate to convert it to nickel chromite, and reducing the chromite at an elevated temperature with hydrogen and thereby forming metallic nickel activated by said sulfate to a state of enhanced hydrogenation ability as compared with nickel prepared in the same way without the use of sulfur compound.

In testimony whereof, I hereunto sign my name.

OWEN G. BENNETT.

In testimony whereof, I hereunto sign my name.

CAREY B. JACKSON.